US008744647B2

(12) United States Patent
Paulsen et al.

(10) Patent No.: US 8,744,647 B2
(45) Date of Patent: Jun. 3, 2014

(54) METHOD AND DEVICE FOR CONTROLLING AND MONITORING THE SURROUNDING AREAS OF AN UNMANNED AERIAL VEHICLE (UAV)

(71) Applicant: Prox Dynamics AS, Hvalstad (NO)

(72) Inventors: Dag Henning Paulsen, Voyenenga (NO); Petter Muren, Slependen (NO)

(73) Assignee: Prox Dynamics AS, Hvalstad (NO)

( * ) Notice: Subject to any disclaimer, the term of this patent is extended or adjusted under 35 U.S.C. 154(b) by 0 days.

(21) Appl. No.: 13/749,918

(22) Filed: Jan. 25, 2013

(65) Prior Publication Data

US 2014/0067162 A1    Mar. 6, 2014

(30) Foreign Application Priority Data

Mar. 22, 2012  (NO) .................................... 20120341

(51) Int. Cl.
*B64C 19/00*    (2006.01)
(52) U.S. Cl.
USPC ............................................. 701/2; 244/190
(58) Field of Classification Search
CPC ............ B64C 39/024; B64C 2201/146; B64C 2201/141; G05D 1/0044; G05D 1/0094; G05D 1/0038; G05D 1/0088; G05D 1/0061; G01C 21/005
USPC ............ 701/2, 3, 23, 467–469; 244/190, 189, 244/75.1, 3.15; 382/154; 342/147
See application file for complete search history.

(56) References Cited

U.S. PATENT DOCUMENTS

| 6,856,894 | B1 * | 2/2005 | Bodin et al. | 701/2 |
| 7,130,741 | B2 * | 10/2006 | Bodin et al. | 701/2 |
| 2005/0090945 | A1 * | 4/2005 | Bodin et al. | 701/2 |
| 2008/0217877 | A1 * | 9/2008 | Simard | 280/33.993 |
| 2008/0243372 | A1 * | 10/2008 | Bodin et al. | 701/206 |
| 2010/0084513 | A1 | 4/2010 | Gariepy et al. | |
| 2010/0286859 | A1 | 11/2010 | Feigh et al. | |
| 2011/0208373 | A1 * | 8/2011 | Lees et al. | 701/2 |
| 2012/0089274 | A1 * | 4/2012 | Lee et al. | 701/2 |

OTHER PUBLICATIONS

Gloria L. Calhoun et al., Synthetic vision system for improving unmanned aerial vehicle operator situation awareness, May 31, 2005, Enhanced and Synthetic Vision, pp. 219-230, XP009168010.
Sheryl L. Chappell, UAV Control with Pictures and Pointing, AIAA Infotech Aerospace 2007 Conference and Exhibit, May 7-10, 2007, Rohnhert Park, California, American Institute of Aeronautics and Astronautics, May 10, 2007, pp. 1-5.

(Continued)

*Primary Examiner* — Marthe Marc-Coleman
(74) *Attorney, Agent, or Firm* — Christopher & Weisberg, P.A.

(57) ABSTRACT

A method and a remote control for controlling and monitoring surrounding areas of an Unmanned Aerial Vehicle (UAV) by an operator with a remote control comprising a flight display are provided. The method and remote control provide an advantageously effect for the purposes of controlling and monitoring the surroundings of a UAV by combining the image captured by a UAV camera with a transparently overlaid positional and navigation map providing a perception enabling the operator to have a complete overall view of the situation, utilizing a common screen section of a flight display and thereby not having to shift eye view. Viewing images and positional and navigation information should not interfere with each other.

8 Claims, 4 Drawing Sheets

(56) References Cited

OTHER PUBLICATIONS

R. Brian Valimont et al., Look Where I'm Going and Go Where I'm Looking: Camera-Up Map for Unmanned Aerial Vehicles, Human-Robot Interaction (HRI), Mar. 6-9, 2011, Lausanne, Switzerland, ACM/IEEE International Conference on, IEEE, Mar. 8, 2011, pp. 275-276, XP032225051.

Mark Draper et al., Evaluation of Synthetic Vision Overlay Concepts for UAV Sensor Operations: Landmark Cues and Picture-in-Picture, Defense Technical Information Center, vol. ADA444719, Feb. 28, 2006, pp. 1-6, XP009168012.

Joseph L. Cooper et al., Integrating critical interface elements for intuitive single-display aviation control of UAVs, Enhanced and Synthetic Vision 2006: Apr. 17-18, 2006, Kissimmee, Florida, USA, SPIE, vol. 6226, Apr. 17, 2006, p. 9, XP009168011.

International Search Report and Written Opinion dated Apr. 24, 2013 for International Application Serial No. PCT/EP2013/051485 International Filing Date: Jan. 25, 2013 consisting of 14 pages.

Norwegian Search Report dated Oct. 19, 2012 for Norwegian Application No. 20120341, filed on Mar. 22, 2012 consisting of 2 pages.

* cited by examiner

METHOD AND DEVICE FOR CONTROLLING AND MONITORING THE SURROUNDING AREAS OF AN UNMANNED AERIAL VEHICLE (UAV)

CROSS-REFERENCE TO RELATED APPLICATION

This application is related to and claims priority from Norwegian Patent Application Serial No. 20120341, filed Mar. 22, 2012, entitled METHOD AND DEVICE FOR CONTROLLING AND MONITORING THE SURROUNDING AREAS OF AN UNMANNED AERIAL VEHICLE (UAV), the entirety of which is incorporated herein by reference.

STATEMENT REGARDING FEDERALLY SPONSORED RESEARCH OR DEVELOPMENT n/a

FIELD OF THE INVENTION

The embodiments herein relate to controlling and monitoring the surrounding areas of an Unmanned Aerial Vehicle (UAV).

BACKGROUND OF THE INVENTION

Modern warfare and law enforcement are characterized by an increasing need for up-to-date situational awareness. To track down, or to protect against, criminals, paramilitary forces or terrorists, law enforcement personnel and soldiers often have an immediate need for information about what is around the next corner or over the hill.

Hostile forces frequently hide themselves from view or exploit the local terrain to gain tactical advantage or escape from pursuers. In the presence of hostile forces, a simple brick wall, barbed wire fence, a body of water, buildings or even a large open area can be an insurmountable obstacle when time is of the essence and tactical resources are unavailable. An active or undetected threat can make the situation dangerous.

Visible indications, noises or predictable actions can reveal friendly forces and put them at risk. Stealth and surprise, however, are important elements that can give a tactical advantage. An UAV is an aircraft with no pilot on board (Also referred to herein as NUAV, where N is an abbreviation for Nano). UAVs can be remotely controlled (e.g. flown by a pilot/operator at a remote ground control station using a controller) or it can fly autonomously based on pre-programmed flight plans or more complex dynamic automation systems. An UAV may also be referred to as a drone. UAVs equipped with video cameras and positioning devices transmit live pictures and positioning information to the operator of the UAV and allow their operator to perform surveillance tasks and gather information from a safe position without exposing themselves.

An UAV may be operated and controlled using a remote control. Traditionally an UAV is operated by controlling such as e.g. a joystick. The joystick is configured to communicate with the UAV, i.e. to send control signal to the UAV using any suitable communication technology. Most joysticks are two-dimensional, having two axes of movement (similar to a mouse), but one and three-dimensional joysticks do exist. A joystick is generally configured so that moving the stick left or right signals movement of the UAV along the X axis, and moving it forward (up) or back (down) signals movement of the UAV along the Y axis. In joysticks that are configured for three-dimensional movement, twisting the stick left (counter-clockwise) or right (clockwise) signals movement of the UAV along the Z axis. In some types of remote controls one or more of these stick movements can be replaced by moving the remote control itself. These three axes—X, Y, and Z—are, in relation to an aircraft, roll, pitch, and yaw.

In addition to a joystick, the remote control configured to operate and control the UAV is usually also supplemented with a Graphical User Interface (GUI). A GUI may be a flight display providing e.g. different dynamic navigation information like speed, direction, waypoints etc. If the UAV is equipped with a camera streaming video or snapshots to the UAV base, these videos or snapshots should also be displayed through the GUI. Traditionally, video and snapshots are displayed on a screen separate from the navigation display, or in a separate part of the GUI display. UAV-kits adjusted for operations in the field have only limited space, since it should comprise both joystick, GUI and power supply as well as the UAVs themselves, preferably compactly stacked so that the personnel easily can carry it in the field during operation. It is therefore a need for a space efficient way of displaying both navigation information and images captured by the UAV without compromising usability and perception.

SUMMARY OF THE INVENTION

The embodiments herein disclose a remote control comprising a flight display and a method for controlling and monitoring surrounding areas of an UAV with the remote control.

In one aspect of the embodiments herein, a method is disclosed for controlling, and monitoring surrounding areas of, an Unmanned Aerial Vehicle (UAV) by an Operator with a remote control comprising a flight display, wherein the UAV is equipped with a camera and a positioning device providing an image (live, still or as a series of snapshots) of the surrounding areas and positioning data of the operating field of the UAV, wirelessly transmitted to the remote control, comprising the steps of displaying the image captured by the camera on the flight display, and providing a transparent layer upon the image comprising a cardinal-oriented, preferably north-oriented map of a range of the operating field including at least a cardinal point, preferably north point symbol (north used in this description could be replaced by any cardinal or intercardinal reference), a UAV symbol oriented on the flight display relative to the north point symbol corresponding to the real compass direction of the UAV provided by the positioning device, and a waypoint symbol positioned relative to the UAV symbol corresponding in distance and direction to the real geographical relation between the UAV and the waypoint.

In another aspect of the embodiments herein, a remote control is disclosed adjusted to control, and monitor surrounding areas of, an Unmanned Aerial Vehicle (UAV) by an operator comprising a flight display, wherein the UAV is equipped with a camera and a positioning device providing an image of the surrounding areas and positioning data of the operating field of the UAV, wirelessly transmitted to the remote control, characterized in that the flight display is adjusted to displaying the image captured by the camera on the flight display, and providing a transparent layer upon the image comprising a north-oriented map of a range of the operating field including at least a north point symbol, a UAV symbol oriented on the flight display relative to the north point symbol corresponding to the real compass direction of the UAV provided by the positioning device, and a waypoint symbol positioned relative to the UAV symbol corresponding in distance and direction to the real geographical relation between the UAV and the waypoint.

Embodiments herein afford many advantages, of which a non-exhaustive list of examples follows:

An advantage of the embodiments herein is that they provide a space efficient remote control for controlling and monitoring surroundings of an UAV.

Another advantage of the embodiments herein is that they do not compromise usability of the remote control and perception of the information provided by the remote control.

Furthermore, the embodiments herein provide the advantage of enabling the operator of the remote control to have a complete overall view of the situation, utilizing a common screen section of a flight display and thereby not having to shift eye view. Viewing images and positional and navigation information does not interfere with each other, rather on the contrary.

The embodiments herein are not limited to the features and advantages mentioned above. A person skilled in the art will recognize additional features and advantages upon reading the following detailed description.

BRIEF DESCRIPTION OF THE DRAWINGS

The following detailed description of the embodiments herein is accompanied by drawings in order to make it more readily understandable. In the drawings.

The drawings are not necessarily to scale and the dimensions of certain features may have been exaggerated for the sake of clarity. Symbols, video and pictures will usually be in color. Emphasis is placed upon illustrating the principle of the embodiments herein.

DETAILED DESCRIPTION OF THE INVENTION

In the following, the embodiments herein will be discussed and example embodiments described by referring to the accompanying drawings.

The embodiments herein provides a surprising advantageously aspect of the gestalt effect for the purposes of controlling and monitoring the surroundings of a UAV by combining the image captured by a UAV camera with a transparently overlaid positional and navigation map providing a perception enabling the operator to have a complete overall view of the situation, utilizing a common screen section of a flight display and thereby not having to shift eye view. Viewing images and positional and navigation information in the way described in the following has shown not interfere with each other, rather on the contrary. The gestalt effect is the form-generating capability of our senses, particularly with respect to the visual recognition of figures and whole forms instead of just a collection of simple lines and curves.

The UAV is operated and controlled using a remote control. The UAV and the remote control transmit and receive signals to/from each other, using any suitable wireless communication technology. Movements of the remote control made by e.g. an operator or activation of buttons on the remote control correspond to movements of the UAV. The UAV comprises a camera for providing images of the surrounding areas in which the UAV is located. The images taken by the camera is transmitted to and displayed on a flight display. In some embodiments, the flight display is comprised in the remote control, e.g. on the front side of the remote control, or it may be provided as a separate unit connected to the remote control. The UAV further comprises positioning devices configured to obtain information related to the position of the UAV in operation and to provide the positional and navigational information to the remote control.

Figure 1:
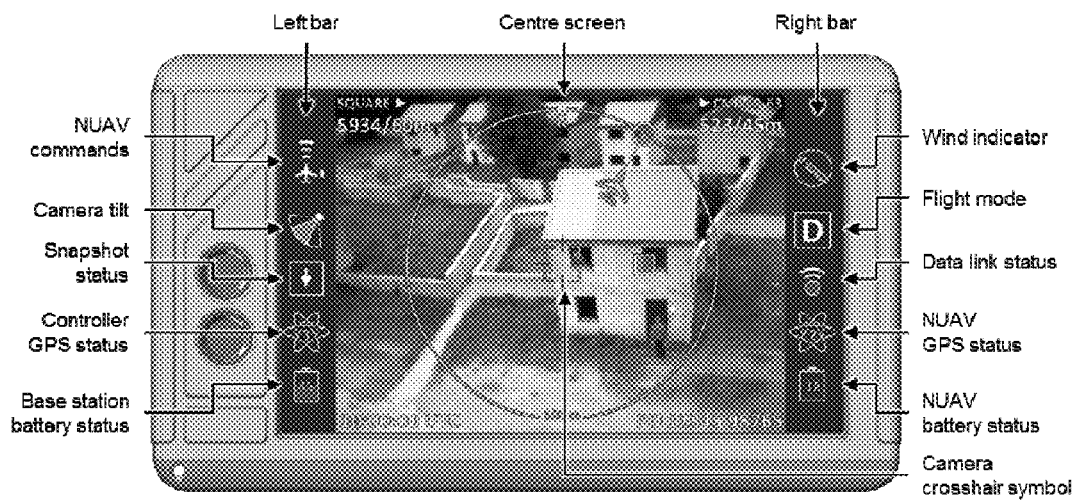
FIG. 1 shows an example of a flight display in a UAV remote control with navigation and positional information transparently overlaid upon an image captured by an UAV camera.

FIG. 1 shows an example of a flight display. The illustrated flight display provides an operator with sensor information (i.e. motion imagery and snapshots), system information, and graphical cues designed to enhance the operator's situational and positional awareness. As shown, there are three distinct areas of the flight display which is used to display relevant information during flight:

Centre screen—Imagery (live video and Snapshot), and position awareness cues.

Right bar—UAV status and information.

Left bar—Base station and Operator status and NUAV/Payload commands.

The centre screen symbols and display modes are in the following described in further details.

The centre screen display combines imagery and different levels of positional and navigation information, transparently overlaid on the imaginary.

The center screen can be switched either manually by activation of e.g. a button on the remote control or automatically between the following modes:

Overlay mode

Expand mode

Basic mode

The imagery may comprise either real time motion (video) imagery or a snapshot depending on selected payload mode. The image is captured by the camera mounted on the UAV, and wirelessly streamed to the remote control equipment on a Digital Data Link (DDL).

The presentation of the positional and navigation information is adjusted to a typical scenario where the UAV starts from the Operator's position heading towards a target point or a waypoint (WP). The information comprises a simplified north-oriented map comprising minimal information to allow the operator to maintain relative positional awareness of its own position, UAV position and position of selected objects. In an example embodiment, there are three modes available to the operator through the flight menu as described below. The imagery information in the figures has been removed for clarity in all examples.

Figure 2:
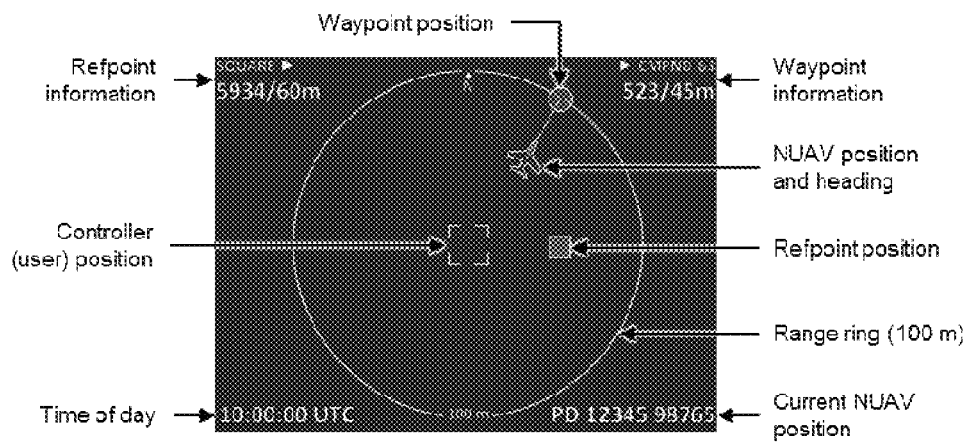
FIG. 2 shows an example of an extract of the elements of the navigation and positional information in overlay mode.

The Overlay mode is the default mode, and provides the operator with the highest level of information. FIG. 2 shows the elements of the Overlay mode, and table 1 describes each of them.

TABLE 1

| Element | Description |
|---|---|
| Operator (user) position | The Operator (i.e. normally the user) position is in the centre of the screen, even when the user relocates. |

TABLE 1-continued

| Element | Description |
|---|---|
| UAV position and heading | UAV position in relation to the user. In the example, the UAV is about 50 meters NNE of the user. The direction of the UAV indicates the NUAV heading (in this case the heading is NNE). |
| Range ring | The range ring provides the scale of the map overlay. The overlay will scale automatically in order to keep all geographical reference objects (i.e. the Operator, the UAV, and the selected WP/RP) within the display area. |
| Time of day | Time of day in UTC. |
| Current UAV position | MGRS (Military Grid Reference System) of current UAV position. Continuously updated by downlinked positioning device information, such as GPS information, from the UAV. |
| Waypoint position | Position of selected WP. The user might select a WP from the Flight menu in order for it to be displayed. A line connecting the UAV and the WP is displayed to ease navigation when flying towards the WP. |
| Waypoint information | Name of the selected WP. Bearing (in MILS) and distance from the NUAV to the selected WP. Only displayed if a WP is selected. |
| Reference point position | Position of selected RP. The user must select a RP from the Flight menu in order for it to be displayed. |
| Reference point information | Name of the selected RP. Bearing (in MILS) and distance from the selected RP to the UAV. Only displayed if a RP is selected. |

The map will automatically scale to keep all geographically referenced objects (i.e. Operator, UAV, and selected WP/RP) within the display area. The scale of the map is indicated by range rings with an outer radius of 100 m, 200 m, 300 m, 400 m, 600 m, 800 m or 1000 m. The radius of the outer ring is marked on the ring.

If the selected WP or RP is the outermost object on the map, the scale will remain constant to keep these within the display area. The Operator may have the possibility to deselect objects, and deselecting the outermost object will rescale the map to encompass the next outermost object.

If the UAV is the outermost object, the map will rescale to the minimum radius required to keep the UAV within the display area. As the distance from the Operator to the UAV is increased the map is zoomed out in steps, and the corresponding range ring is displayed. The opposite will happen if the UAV is flown towards the Operator thus reducing the distance.

Figure 3:
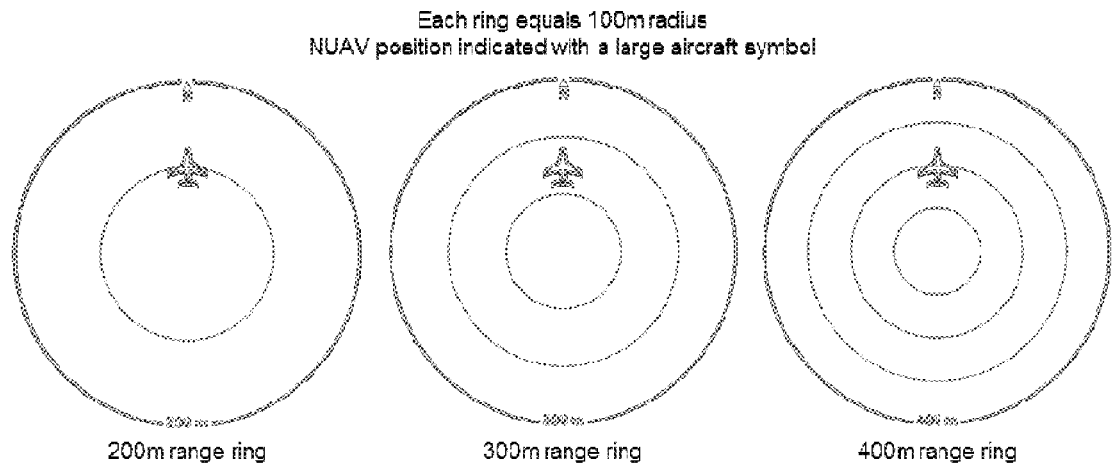
FIGS. 3 and 4 shows examples of different range rings of the navigation and positional information.
Figure 4:
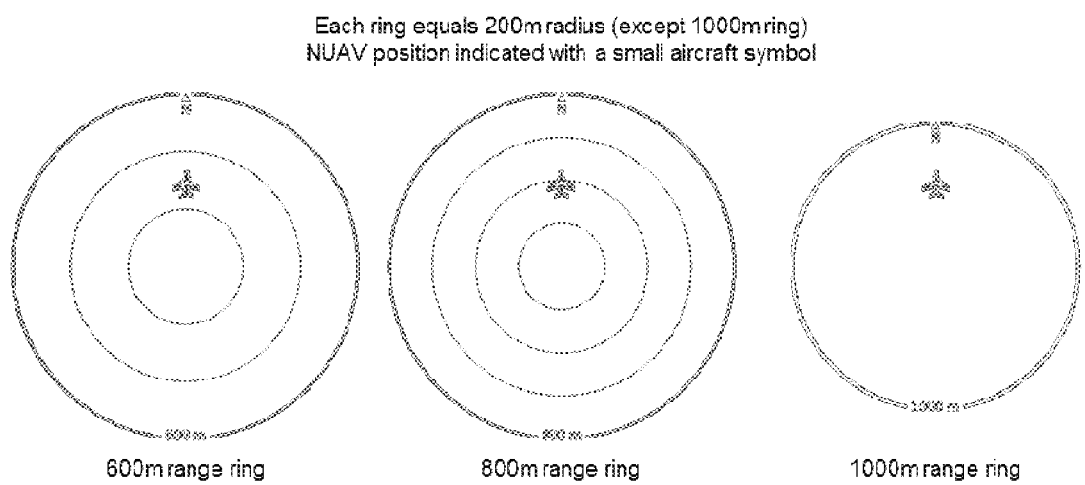

FIGS. 3 and 4 shows examples of different range rings. The 300 m and 600 m, and the 400 m and 800 m range rings are almost identical except for the numeric radius marker. In order to differentiate between them a smaller UAV symbol might be used when the radius is more than 400 m (i.e. 600 m and above) as illustrated in FIG. 4.

The 1000 m range ring in this example is smaller and is using a thicker outline than the other range rings. This is to highlight to the Operator that the outermost object is close to the maximum range of the DDL. It also indicates that the map is at the smallest scale, and objects outside approximately 1200 m will not be displayed.

Figure 5:
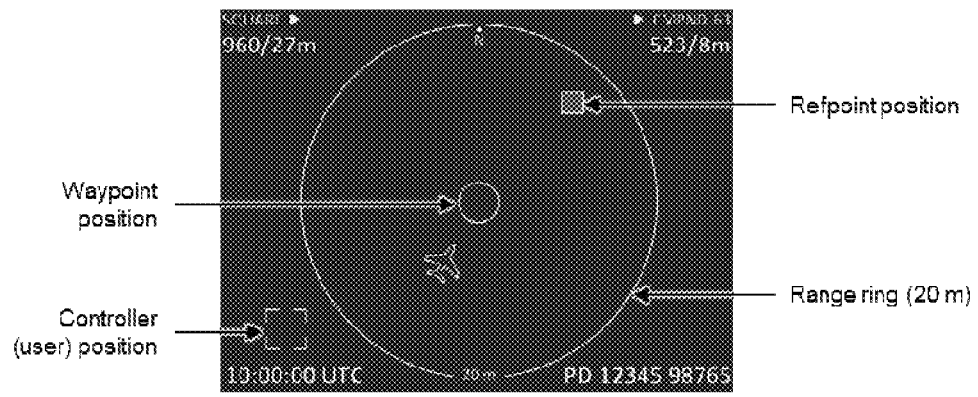
FIG. 5 shows an example of an extract of the elements of the navigation and positional information in expand mode.

FIG. 5 shows an example of the Expand mode. In this mode, the display is centred on the selected WP and expanded to cover a radius of 20 meters from the WP. This allows the Operator to accurately maneuver the UAV in relation to the WP at longer ranges using the screen only.

The UAV must be within a pre-defined distance (in this example, approximately 20 meters) of the selected WP in order to switch to Expand mode. If the mode is selected when the UAV is outside the predefined distance, the mode will be pending, i.e. it will automatically enter Expand mode when the UAV is maneuvered to within the predefined distance to the WP. The system will automatically transfer back to Overlay mode if the UAV is maneuvered outside the Expand mode coverage area.

The information provided in Expand mode is similar to Overlay mode, except for the elements described in table 2.

TABLE 2

| Element | Description |
|---|---|
| Operator (user) position | The Operator position is only displayed if it is within the Expand mode coverage area. |
| Range ring | Only a 20 meter range ring is displayed. If the UAV is flown outside approximately 20 meters from the WP, the system transfers back to Overlay mode. |
| Waypoint position | Position of selected WP. Always centred on the screen. |
| Refpoint position | Position of selected RP. Only displayed if within the Expand mode coverage area. |

Figure 6:
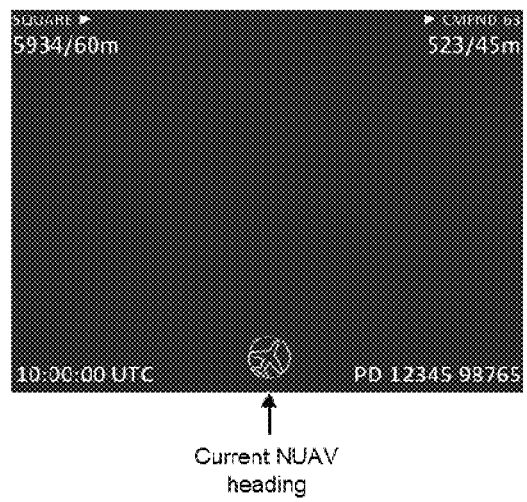
FIG. 6 shows an example of an extract of the elements of the navigation and positional information in basic mode.

FIG. 6 shows an example of Basic mode where the map overlay is removed from the Centre screen and replaced by symbols to indicate UAV heading.

Figure 7:
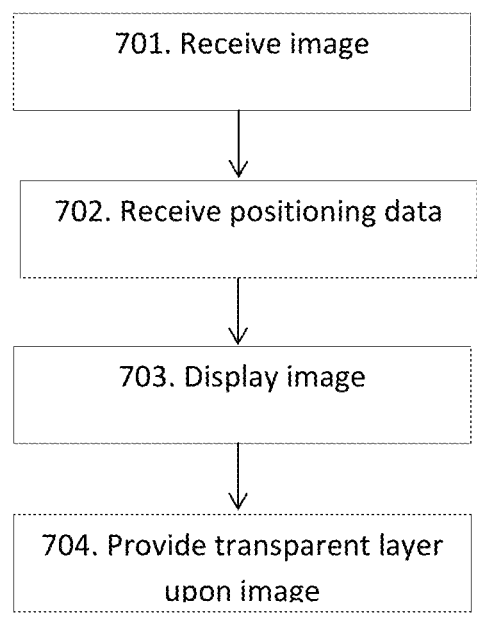
FIG. 7 is a flow chart illustrating an example of the method according to the present invention.

FIG. 7 is a flow chart illustrating one embodiment of the basic steps of the method according to the invention. The embodiment includes respectively receiving captured image and positioning data from the UAV, displaying the image on the flight display and providing a transparent layer of a map based on the positioning data upon the image.

The above description discloses different example embodiments for illustrative purposes. A person skilled in the art would realize a variety of different combinations of symbols, symbol designs all being within the scope of the embodiments.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

It should also be emphasized that the steps of the methods defined in the appended claims may, without departing from the embodiments herein, be performed in another order than the order in which they appear in the claims.

What is claimed is:

1. A method for controlling, and monitoring surrounding areas of, an Unmanned Aerial Vehicle (UAV) by an Operator with a remote control, comprising:

providing a flight display, and a UAV equipped with a camera and a positioning device providing an image of surrounding areas and positioning data of an operating field of the UAV, wirelessly transmitted to a remote control;

displaying the image captured by the camera on the flight display;

providing a transparent layer upon the image comprising a cardinal-oriented map of a range of the operating field including at least a cardinal point, a UAV symbol oriented on the flight display relative to the cardinal point corresponding to a real compass direction of the UAV provided by the positioning device, the cardinal-oriented map including an Operator position symbol;

a waypoint symbol positioned relative to the UAV symbol corresponding to distance and direction to a real geographical relation between the UAV and the waypoint;

displaying one or more rings indicating a scale of the cardinal-oriented map, the one or more rings being centered around the Operator position symbol which coincides with a center of the flight display.

2. The method according to claim 1, wherein the Operator position symbol is positioned relative to the UAV symbol and the waypoint symbol corresponding in distance and direction to a real geographical relation between the Operator and the UAV and the waypoint, respectively.

3. The method according to claim 1, wherein the one or more rings are marked with a radius stating the scale of the cardinal-oriented map.

4. The method according to claim 1, further comprising when the UAV passes a predefined distance from the Operator position, then switching the scale of the cardinal-oriented map, and changing the one or more rings in terms of size and scale indication.

5. The method according to claim 1, further comprising when the UAV passes a predefined distance to the waypoint position, then switching the scale of the cardinal-oriented map and coinciding a center of the one or more rings with the waypoint symbol.

6. The method according to claim 1, wherein the image is a video image or one or more snapshots.

7. A remote control adjusted to control, and monitor surrounding areas of, an Unmanned Aerial Vehicle (UAV) by an Operator, the remote control comprising:
   a flight display in communication with the remote control, the remote control being in communication with an UAV that is equipped with a camera and a positioning device providing an image, live or still a series of snapshots, of the surrounding areas and positioning data of the operating field of the UAV, wirelessly transmitted to the remote control, the flight display being:
   adjusted to display the image captured by the camera on the flight display;
   provide a transparent layer upon the image comprising a cardinal-oriented map of a range of the operating field including at least a cardinal point, a UAV symbol oriented on the flight display relative to the cardinal point corresponding to a real compass direction of the UAV provided by the positioning device, and a waypoint symbol positioned relative to the UAV symbol corresponding in distance and direction to a real geographical relation between the UAV and the waypoint, the cardinal-oriented map including an Operator position symbol; and
   display one or more rings indicating a scale of the cardinal-oriented map, the one or more rings being centered around the Operator position symbol which coincides with a center of the flight display.

8. A method for controlling, and monitoring surrounding areas of, an Unmanned Aerial Vehicle (UAV) by an Operator with a remote control, comprising:
   providing a flight display, and a UAV equipped with a camera and a positioning device providing an image of surrounding areas and positioning data of an operating field of the UAV, wirelessly transmitted to a remote control;
   displaying the image captured by the camera on the flight display;
   providing a transparent layer upon the image comprising a cardinal-oriented map of a range of the operating field including at least a cardinal point, a UAV symbol oriented on the flight display relative to the cardinal point corresponding to a real compass direction of the UAV provided by the positioning device;
   a waypoint symbol positioned relative to the UAV symbol corresponding in distance and direction to a real geographical relation between the UAV and the waypoint;
   displaying one or more rings indicating a scale of the cardinal-oriented map; and
   when the UAV passes a predefined distance to the waypoint position, then switching the scale of the cardinal-oriented map and coinciding a center of the one or more rings with the waypoint symbol.

* * * * *